United States Patent
Lee et al.

(10) Patent No.: US 9,098,890 B2
(45) Date of Patent: Aug. 4, 2015

(54) ROBOT FOR MANAGING STRUCTURE AND METHOD OF CONTROLLING THE ROBOT

(71) Applicant: Daegu Gyeongbuk Institute of Science and Technology, Daegu (KR)

(72) Inventors: Seung Yeol Lee, Daegu (KR); Jeon Il Moon, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 92 days.

(21) Appl. No.: 14/050,383

(22) Filed: Oct. 10, 2013

(65) Prior Publication Data

US 2014/0314306 A1 Oct. 23, 2014

(30) Foreign Application Priority Data

Apr. 18, 2013 (KR) ........................ 10-2013-0043218

(51) Int. Cl.
*G06K 9/00* (2006.01)
*G06T 7/00* (2006.01)

(52) U.S. Cl.
CPC ..... *G06T 7/0004* (2013.01); *G06T 2207/10024* (2013.01); *G06T 2207/10028* (2013.01); *G06T 2207/30132* (2013.01)

(58) Field of Classification Search
None
See application file for complete search history.

(56) References Cited

U.S. PATENT DOCUMENTS

| | | | | |
|---|---|---|---|---|
| 2004/0217498 | A1* | 11/2004 | Ondrus et al. | 264/40.1 |
| 2008/0312769 | A1* | 12/2008 | Sato et al. | 700/249 |
| 2009/0004859 | A1* | 1/2009 | Kimura et al. | 438/691 |
| 2010/0310329 | A1* | 12/2010 | Harif | 408/1 R |
| 2011/0126681 | A1* | 6/2011 | Blanchet et al. | 83/51 |
| 2012/0141012 | A1* | 6/2012 | Sakai et al. | 382/149 |
| 2012/0201448 | A1* | 8/2012 | Nammoto et al. | 382/153 |

FOREIGN PATENT DOCUMENTS

KR 10-0804669 B1 2/2008

\* cited by examiner

*Primary Examiner* — Hadi Akhavannik
(74) *Attorney, Agent, or Firm* — Revolution IP, PLLC

(57) ABSTRACT

Provided are a robot for managing a structure, and a method of controlling the robot. The robot for maintaining and repairing the structure measures a luminance value by capturing an image of the structure, or measures depth information of the structure by using a laser sensor or stereo vision, determines a protruding portion or depressed portion of the structure by using the measured luminance value or the measured depth information. Also, the robot removes the determined protruding portion and fills the determined depressed portion by using a combination hardener. Accordingly, protrusion, depression, and crack of a wall caused by deterioration or poor construction of the structure may be automatically found and repaired so as to efficiently manage the structure.

8 Claims, 3 Drawing Sheets

ROBOT FOR MANAGING STRUCTURE AND METHOD OF CONTROLLING THE ROBOT

CROSS-REFERENCE TO RELATED PATENT APPLICATION

This application claims the benefit of Korean Patent Application No. 10-2013-0043218, filed on Apr. 18, 2013, in the Korean Intellectual Property Office, the disclosure of which is incorporated herein in its entirety by reference.

BACKGROUND OF THE INVENTION

1. Field of the Invention

The present invention relates to a robot for managing a structure and a method of controlling the robot, and more particularly, to a robot for managing a structure, which is capable of efficiently maintaining and repairing a structure in a construction site, and a method of controlling the robot.

2. Description of the Related Art

A robot is a mechanical device that automatically moves by receiving a signal or information from a control device or receiving a command from a computer, and generally means a mechanical device replacing a human being for a dangerous work, simple repetitive work, and a heavy labor.

Since the robot has a self-determining calculating function and a mechanical structure capable of verifying a moving location, studies for using the robot in a construction site are actively performed. In detail, robots for examining, testing, coating, spraying, framing, reinforcing, plastering, and cleaning have been developed or being studied in order to compensate for insufficient labor forces and reduction of skilled workers in the construction site.

Currently, since most developments and studies on construction robots are focused on building of a construction site, developments and studies on robots for maintenance are considerably insufficient. In detail, developments and studies on apparatuses for maintaining and repairing a structure that has been built long time ago or poorly designed are considerably required.

A background technology of the present invention is disclosed in KR-0804669 (published on Feb. 20, 2008).

SUMMARY OF THE INVENTION

The present invention provides a robot for efficiently maintaining and repairing a structure in a construction site, and a method of controlling the robot.

According to an aspect of the present invention, there is provided a robot for managing a structure to maintain and repair the structure, the robot including: a vision module for measuring a luminance value by capturing an image of the structure, or measuring depth information of the structure by using a laser sensor or stereo vision; a control module for determining a protruding portion or depressed portion of the structure by using the measured luminance value or the measured depth information; a chipping module for removing the protruding portion determined by the control module; and an injection module for filling the depressed portion determined by the control module by using a combination hardener.

The robot may further include a sealing module for injecting an injection mixture to a cracked portion, wherein the control module may detect the cracked portion by using the measured luminance value.

The control module may determine a region whose luminance value is higher than a first reference luminance value or depth information is lower than a first reference depth value as the protruding portion, determine a region whose luminance value is lower than a second reference luminance value or depth information of higher than a second reference depth value as the depressed portion, and determine the structure to be a maintenance target when the measured luminance value is lower than the first reference luminance value and higher than the second reference luminance value or the measured depth information is higher than the first reference depth value or lower than the second reference depth value.

The control module may determine the region as a cracked portion when the measured luminance value is lower than the second reference luminance value and is linear.

The control module may analyze a color of a location where the measured luminance value is higher than the first reference luminance value, and determine whether a reinforcing bar is included based on the analyzed color to remove the protruding portion excluding the reinforcing bar if the reinforcing bar is included.

According to another aspect of the present invention, there is provided a method of controlling a robot for managing a structure to maintain and repair the structure, the method including: measuring a luminance value by capturing an image of the structure, or measuring a distance between the structure and the robot by using a laser sensor or stereo vision; determining a protruding portion or depressed portion of the structure by using the measured luminance value or measured distance; and removing a portion determined to be the protruding portion and filling a portion determined to be the depressed portion by using a combination hardener.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
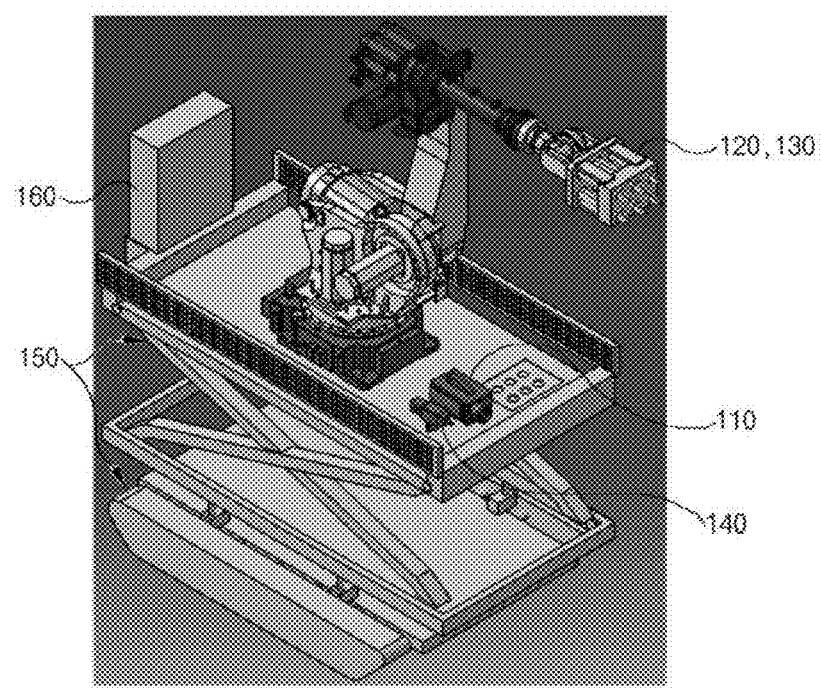
FIG. 1 is a diagram of a robot for managing a structure, according to an embodiment of the present invention.

Hereinafter, the present invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements, and elements not related to the description are not shown for clear understanding of the present invention.

Throughout the specification, it will be understood that when a portion "includes" an element, another element may be further included unless defined otherwise.

First, a robot for managing a structure, according to an embodiment of the present invention will be described.

Figure 2:
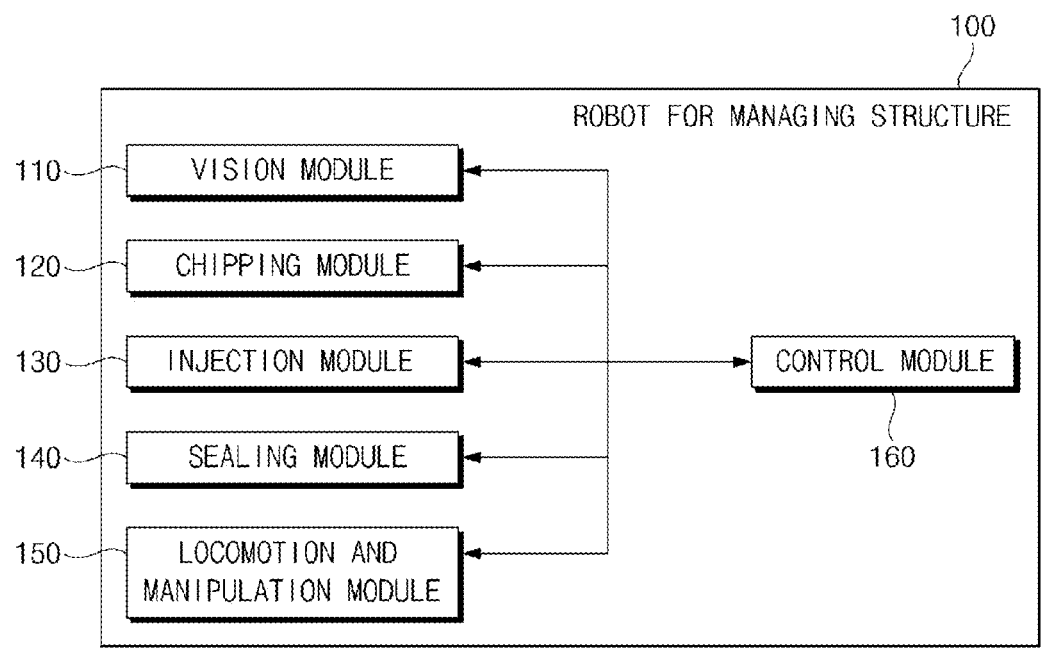
FIG. 2 is a block diagram of the robot for managing a structure of FIG. 1.

FIG. 1 is a diagram of a robot 100 for managing a structure, according to an embodiment of the present invention, and FIG. 2 is a block diagram of the robot 100.

As shown in FIGS. 1 and 2, the robot 100 includes a vision module 110, a chipping module 120, an injection module 130, a sealing module 140, a locomotion and manipulation module 150, and a control module 160.

The vision module 110 includes a video camera, and transmits an image of a structure captured through the video camera to the control module 160. Here, the structure whose image is captured by the vision module 110 is a management target, i.e., a side of a construction, such as a general house, a sewer, or a tunnel. For example, the structure may include a wall or a ceiling.

Here, the video camera is used to capture the image, but any other image capturing device capable of classifying colors and contrasts of a protruding portion, such as a protrusion, and a depressed portion, such as a depression, from the captured image may be used.

Also, the vision module 110 may calculate a distance from the structure by using a laser sensor or a stereo vision, and classify the protruding portion and the depressed portion based on depth information (distance value) of the calculated distance.

Also, the vision module 110 may include a unit for moving the video camera, and in this case, the video camera may move a range set according to control of the control module 160 so as to capture the image or to measure the distance from the structure by using a laser sensor or stereo vision, and transmit the captured image or the measured distance to the control module 160.

The chipping module 120 includes a device for removing the protruding portion of the structure by grinding or chipping the protruding portion, and removes the protruding portion according to control of the control module 160. Here, the chipping module 120 may perform chipping by using a multiple chipping heads, wherein chipping heads are automatically replaced and used according to operations by using various operating tools.

The injection module 130 includes a storage container for storing a combination hardener in minerals for construction, such as cement, and a nozzle for injecting the stored combination hardener, and moves the nozzle according to control of the control module 160 to inject the stored combination hardener into a depressed portion at a certain location.

The sealing module 140 includes an injection mixture to be injected into a small hole or crack of the structure, and fills the crack by injecting the injection mixture into a certain location according to control of the control module 160. Here, the injection mixture may be a mixture, such as glue or silicon.

The locomotion and manipulation module 150 includes at least two wheels or a caterpillar for locomotion, and moves a location of the robot 100 according to a control signal of the control module 160. Also, the locomotion and manipulation module 150 includes a multi-degree of freedom (DOF) robot manipulator to perform detailed operations related to the vision module 110, the chipping module, the injection module 130, and the sealing module 140 according to a control single of the control module 160.

The control module 160 controls the vision module 110, the chipping module 120, the injection module 130, the sealing module 140, and the locomotion and manipulation module 150 to maintain and repair the structure. In detail, the control module 160 measures a luminance value according to pixels by analyzing contrasts of the image received from the vision module 110, and when a protruding portion is found based on the measured luminance value, flattens a management target of the structure by performing chipping. Also, when a depressed portion or a cracked portion is found by using the measured luminance value, the control module 160 may perform injection and sealing to fill the depressed portion or the cracked portion. A method of controlling the robot 100 by using the control module 160 will be described in detail later with reference to FIG. 2.

Also, when a protruding portion, a depressed portion, or a cracked portion is not found by analyzing the image received from the vision module 110, the control module 160 may operate the locomotion and manipulation module 150 to move the robot 100 by a predetermined distance. For example, when a movement range of the vision module 110 for capturing an image is 10 m in a diameter, the control module 160 may move the robot 100 by 8 m by using the locomotion and manipulation module 150 so as to reduce an overlapping portion and analyze a new portion as much as possible.

Meanwhile, the control module 160 may classify a protruding portion and a depressed portion based on depth information measured by using the laser sensor or the stereo vision of the vision module 110. Here, the control module 160 has a reference range with respect to a depth (distance) with the structure, and when depth information of a portion is lower than the reference range, the portion is determined to be a protruding portion and when depth information of a portion is higher than the reference range, the portion is determined to be a depressed portion so that the control module 160 performs chipping or injection.

The robot 100 according to the current embodiment efficiently manages the structure by automatically searching for and repairing a protrusion, a depression, and a crack of a wall or ceiling generated due to deterioration or poor construction of the structure. In addition, deficient maintenance caused by insufficient labor forces and reduction of skilled workers may be efficiently prevented.

A method of controlling the robot 100, according to an embodiment of the present invention will now be described in detail with reference to FIG. 3.

Figure 3:
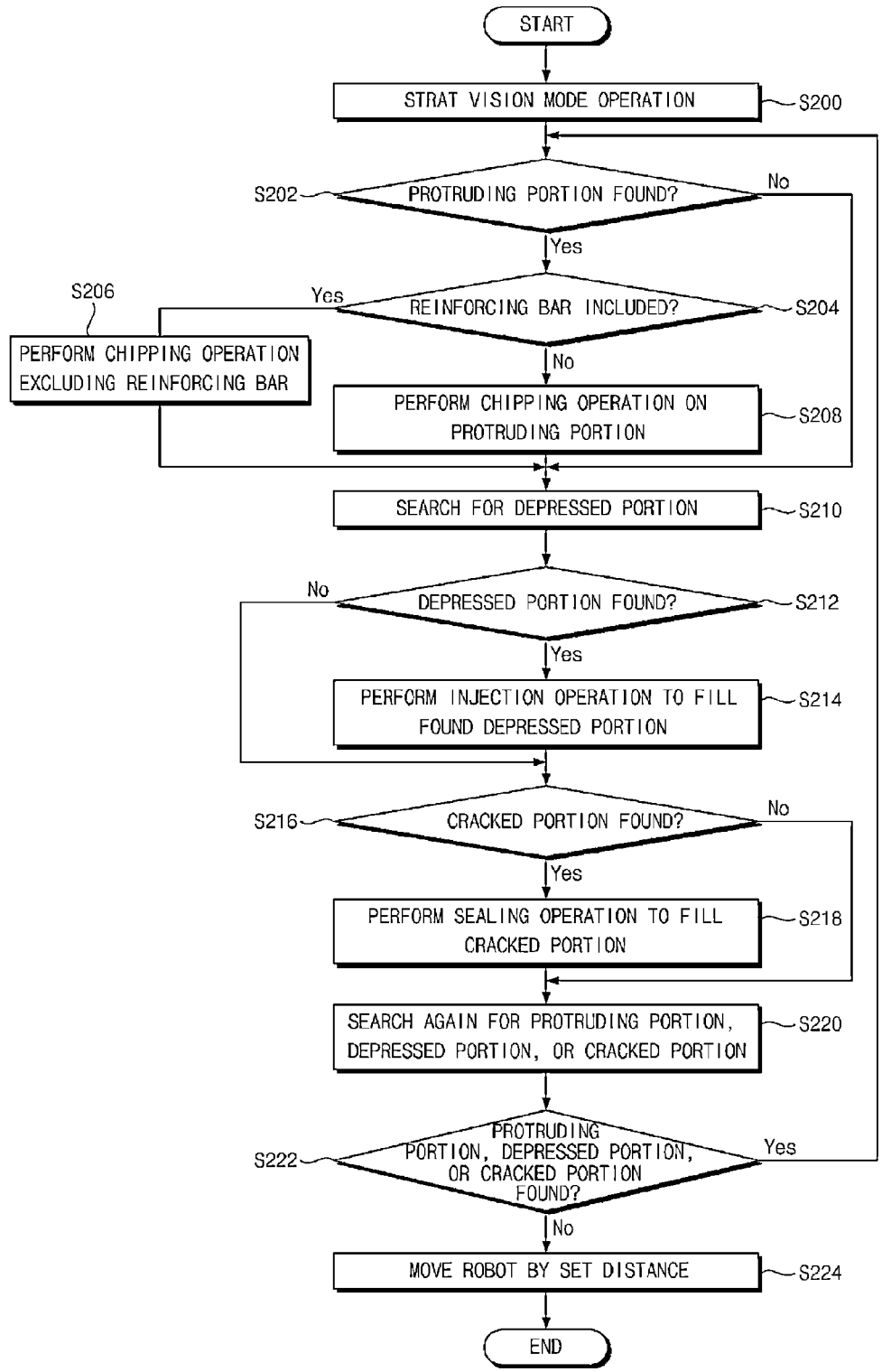
FIG. 3 is a flowchart illustrating a method of managing a structure, according to an embodiment of the present invention.

FIG. 3 is a flowchart illustrating a method of managing a structure, according to an embodiment of the present invention.

As shown in FIG. 3, the control module 160 of the robot 100 starts a vision mode operation to maintain and repair the structure.

The control module 160 starts a vision mode operation through the vision module 110 so as to capture an image of a wall of the structure in operation S200, and analyzes contrasts of the captured image received from the vision module 110. In other words, the control module 160 measures a luminance value according to pixels on a management target of the structure based on the image.

The control module 160 determines whether there is a protruding portion by analyzing the contrasts of the captured image in operation S202. In detail, the control module 160 analyzes the luminance value in the image, and determines whether there is a protruding portion based on whether the luminance value is higher than a set range. In other words, the control module 160 determines a region corresponding to a pixel whose luminance value is higher than a first reference luminance value, for example, 30 nit, to be a protruding portion.

Here, the first reference luminance value may be a luminance value set by a user or a value set to be higher by 3 nit than an average of luminance values measured from the captured image.

Meanwhile, the control module 160 may search for a protruding portion or a depressed portion by using depth information instead of the captured image. Here, the control module 160 calculates depth information with the structure by using the laser sensor or the stereo vision, and determines whether there is a protruding portion or a depressed portion by using the calculated depth information.

When a protruding portion is not found in operation S202, i.e., when the luminance values of all pixels are within the set range, the control module 160 performs operations S210 through S218.

When a protruding portion is found in operation S202, the control module 160 detects a color of the protruding portion, and compares the detected color with a color, for example, red, predetermined by the user to determine whether a reinforcing bar is included in the protruding portion, in operation S204. In detail, the control module 160 detects a red/green/blue (RGB) value of the protruding portion, and compares the detected RGB value with a set RGB value (R=255, G=10, and B=10) to determine whether a reinforcing bar is included based on whether the detected RGB value is within a predetermined range (R, G, and B each within 20).

Here, the control module 160 detects the reinforcing bar based on a red color, but the reinforcing bar may be detected based on any one of green, yellow, black, gray, blue, white, and pink, according to mechanical properties of the reinforcing bar for concrete.

When it is determined that the reinforcing bar is included in operation S204, the control module 160 performs a chipping operation on the protruding portion excluding a region including the reinforcing bar by using the chipping module 120, in operation S206, and then performs operations S210 through S218.

When it is determined that the reinforcing bar is not included in operation S204, the control module 160 performs a chipping operation on the protruding portion in operation S208.

Next, the control module 160 searches for a depressed portion or a cracked portion in the structure through the vision module 110, in operation S210.

First, the control module 160 determines whether there is a depressed portion in operation S212. In detail, for example, the control module 160 determines whether there is a depressed portion based on whether the measured luminance value is lower than a second reference luminance value, for example, 10 nit.

In other words, the control module 160 determines a region corresponding to a pixel whose luminance value is lower than the second reference luminance value to be a depressed portion. Here, the second reference luminance value is lower than the first reference luminance value, and may be set by the user or set lower than an average of the measured luminance values by 3 nit.

When a depressed portion is found in operation S212, the control module 160 performs an injection operation of injecting cement so as to fill the depressed portion by using the injection module 130 in operation S214, and then performs operation S216.

When a depressed portion is not found in operation S212, i.e., when the luminance values of all pixels are between the first and second reference luminance values, the control module 160 searches for a cracked portion by using the vision module 110, and determines whether the cracked portion is found in operation S216. In detail, the control module 160 determines whether there is a cracked portion based on whether a pixel whose luminance value is lower than the second reference luminance value is linear. Here, the control module 160 determines there is a cracked portion when a depressed portion is linear as shown in FIG. 4B below.

When a cracked portion is found in operation S216, the control module 160 performs a sealing operation to fill the cracked portion by using an injection mixture through the sealing module 140 in operation S218.

When a cracked portion is not found in operation S218, the control module 160 searches again for a protruding portion, a depressed portion, or a cracked portion through the vision module 110 in operation S220, and determines whether at least one of a protruding portion, a depressed portion, and a cracked portion is found in operation S222.

When at least one of the protruding portion, the depressed portion, and the cracked portion is found in operation S222, the control module 160 repeats operations S202 through S222.

When the protruding portion, the depressed portion, and the cracked portion are not found in operation S222, the control module 160 moves the robot 100 by a set distance by using the locomotion and manipulation module 150 in operation S224, and performs operations S200 through S222.

Figure 4A:
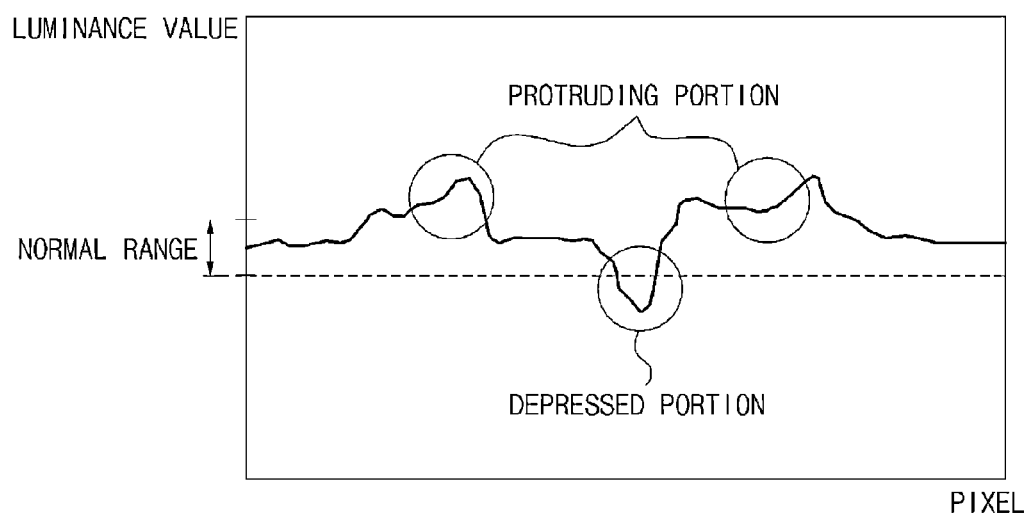
FIG. 4A is a diagram for describing a protruding portion and a depressed portion of a structure, which are measured by a robot for managing a structure, according to an embodiment of the present invention.
Figure 4B:
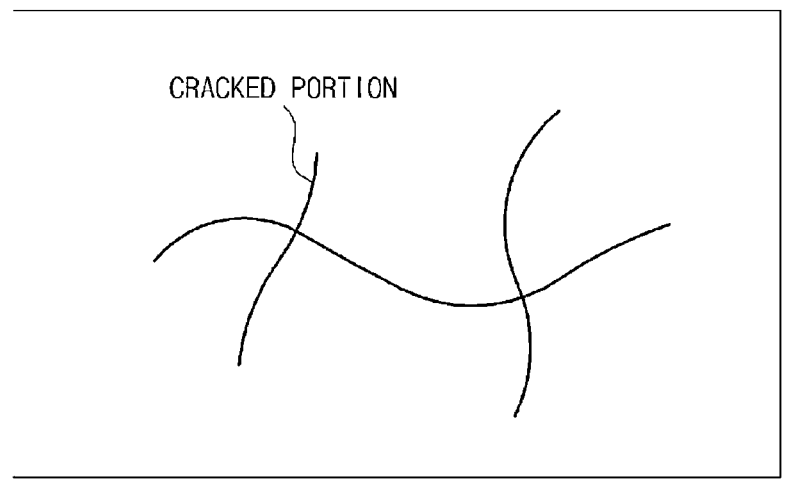
FIG. 4B is a diagram for describing a cracked portion measured by a vision module of a robot for managing a structure, according to an embodiment of the present invention.

FIG. 4A is a diagram for describing a protruding portion and a depressed portion of a structure, which are measured by the robot 100, according to an embodiment of the present invention.

As shown in FIG. 4A, the control module 160 classifies a protruding portion and a depressed portion based on a luminance value of a pixel measured by the vision module 110. Here, the control module 160 performs a chipping or injection operation by determining a region whose luminance value is higher than a normal range to be a protruding portion and a region whose luminance value is lower than the normal range to be a depressed portion, wherein the normal range is between a first reference luminance value and a second reference luminance value. Here, a region in the normal range is a region where the robot 100 does not perform any operation.

Meanwhile, the control module 160 measures a distance between the vision module 110 and a management target by using the laser sensor or stereo vision of the vision module 110, and extracts depth information of the management target through the measured distance. In other words, the control module 160 determines a region from among the management target whose distance from the vision module 110 is lower than a normal range (depth information is negative (−)) to be a protruding portion, and a region whose distance from the vision module 110 is higher than the normal range (depth information is positive (+)) to be a depressed portion. Here, when a pixel of the depressed portion is linear, the control module 160 determines the pixel to be a cracked portion.

FIG. 4B is a diagram for describing a cracked portion measured by the vision module 110 of the robot 100, according to an embodiment of the present invention.

As shown in FIG. 4B, the control module 160 of the robot 100 performs a sealing operation when a pixel whose luminance value measured by the vision module 110 is lower than a second reference luminance value and is linear, by determining the pixel to be a cracked portion.

Accordingly, protrusion, depression, and crack of a wall caused by deterioration or poor construction of the structure may be automatically found and repaired so as to efficiently manage the structure.

As such, according to one or more embodiments of the present invention, a protrusion, a depression, or a crack on a wall generated by deterioration or poor construction of a structure may be automatically found and repaired so that the structure is efficiently managed.

Also, deficient maintenance caused by insufficient labor forces and reduction of skilled workers may be efficiently prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A robot for managing a structure to maintain and repair the structure, the robot comprising:
   a vision module for measuring a luminance value by capturing an image of the structure, or measuring a depth information value of the structure by using a laser sensor or stereo vision;
   a control module for determining a protruding portion or depressed portion of the structure by using the measured luminance value or the measured depth information value;
   a chipping module for removing the protruding portion determined by the control module; and
   an injection module for filling the depressed portion determined by the control module by using a combination hardener,
   wherein the control module analyzes a color of a location where the measured luminance value is higher than a first reference luminance value, and determines whether a reinforcing bar is included based on the analyzed color to remove the protruding portion excluding the reinforcing bar if the reinforcing bar is included.

2. The robot of claim 1, further comprising a sealing module for injecting an injection mixture to a cracked portion,
   wherein the control module detects the cracked portion by using the measured luminance value.

3. The robot of claim 1, wherein the control module determines a region whose luminance value is higher than the first reference luminance value or depth information value is lower than a first reference depth value as the protruding portion, determines a region whose luminance value is lower than a second reference luminance value or depth information value of higher than a second reference depth value as the depressed portion, and determines the structure to be a maintenance target when the measured luminance value is lower than the first reference luminance value and higher than the second reference luminance value or the measured depth information value is higher than the first reference depth value or lower than the second reference depth value.

4. The robot of claim 3, wherein the control module determines the region as a cracked portion when the measured luminance value is lower than the second reference luminance value and is linear.

5. A method of controlling a robot for managing a structure to maintain and repair the structure, the method comprising:
   measuring a luminance value by capturing an image of the structure, or measuring a distance between the structure and the robot by using a laser sensor or stereo vision;
   determining a protruding portion or depressed portion of the structure by using the measured luminance value or measured distance;
   removing a portion determined to be the protruding portion and filling a portion determined to be the depressed portion by using a combination hardener;
   analyzing a color of a location where the measured luminance value is higher than a first reference luminance value; and
   determining whether a reinforcing bar is included based on the analyzed color to remove the protruding portion excluding the reinforcing bar if the reinforcing bar is included.

6. The method of claim 5, further comprising:
   determining a cracked portion by using the measured luminance value; and
   injecting an injection mixture into the cracked portion.

7. The method of claim 6, wherein the determining of the protruding portion or depressed portion comprises:
   determining a region whose luminance value is higher than the first reference luminance value as the protruding portion;
   determining a region whose luminance value is lower than a second reference luminance value as the depressed portion; and
   determining the structure to be a maintenance target when the measured luminance value is lower than the first reference luminance value and higher than the second reference luminance value.

8. The method of claim 7, wherein the determining of the cracked portion comprises determining a region whose luminance value is lower than the second reference luminance value and is linear as the cracked portion.

* * * * *